United States Patent
Lee et al.

(10) Patent No.: US 9,428,065 B2
(45) Date of Patent: Aug. 30, 2016

(54) AUTOMATIC FOLDING ELECTRONIC CAR

(71) Applicant: KC Motors Co., Ltd., Yongin-si, Gyeonggi-do (KR)

(72) Inventors: Won Dong Lee, Yongin-si (KR); Yong Joo Kim, Yongin-si (KR); Ki Won Lee, Yongin-si (KR); Kyoung Hoon Yoon, Yongin-si (KR); Tae Ho Kim, Suwon-si (KR); Chang Won Seo, Seongnam-si (KR); Tae Hyoun Jang, Yongin-si (KR)

(73) Assignee: KC Motors Co., Ltd., Yongin-si, Gyeonggi-do (KR)

(*) Notice: Subject to any disclaimer, the term of this patent is extended or adjusted under 35 U.S.C. 154(b) by 0 days.

(21) Appl. No.: 15/000,814

(22) Filed: Jan. 19, 2016

(65) Prior Publication Data
US 2016/0221450 A1    Aug. 4, 2016

(30) Foreign Application Priority Data
Feb. 4, 2015 (KR) .......................... 10-2015-0017465

(51) Int. Cl.
| | | |
|---|---|---|
| *B62D 39/00* | (2006.01) | |
| *B60L 11/18* | (2006.01) | |
| *B60K 1/04* | (2006.01) | |
| *B60L 15/00* | (2006.01) | |
| *B60T 1/02* | (2006.01) | |

(52) U.S. Cl.
CPC .............. *B60L 11/18* (2013.01); *B60K 1/04* (2013.01); *B60L 15/00* (2013.01); *B60T 1/02* (2013.01); *B62D 39/00* (2013.01)

(58) Field of Classification Search
CPC ............ B60K 1/04; B62D 39/00; B60T 1/02
See application file for complete search history.

(56) References Cited

U.S. PATENT DOCUMENTS

| | | | | | |
|---|---|---|---|---|---|
| 3,623,749 | A | * | 11/1971 | Jensen ................. | B62K 15/006 280/278 |
| 5,150,762 | A | * | 9/1992 | Stegeman ............. | B60K 1/00 180/208 |
| 7,445,215 | B2 | * | 11/2008 | Prather ................ | B62B 3/1404 280/33.994 |
| 7,451,848 | B2 | * | 11/2008 | Flowers ............... | A61G 5/045 180/208 |
| 7,520,513 | B1 | * | 4/2009 | Bush .................... | B62B 1/22 280/35 |

FOREIGN PATENT DOCUMENTS

| | | |
|---|---|---|
| KR | 20-0259004 Y1 | 1/2002 |
| KR | 20-0261766 Y1 | 1/2002 |
| KR | 10-0541021 B1 | 1/2006 |

\* cited by examiner

*Primary Examiner* — John Walters
*Assistant Examiner* — James Triggs
(74) *Attorney, Agent, or Firm* — Novick, Kim & Lee, PLLC; Jae Youn Kim

(57) ABSTRACT

Provided is an automatic folding electronic car that is driven with power supplied from a battery and folded automatically including: a body portion to which a front frame and a rear frame are connected rotatably through a connection shaft and on which a support shaft is formed on an upper part of the rear frame so as to support the front frame from a rear side; a front wheel portion that is arranged on a front of the body portion and is provided with a pair of front wheels connected through a front wheel shaft and a braking means; a rear wheel portion that is arranged on a rear of the body portion and is provided with a pair of rear wheels connected through a rear wheel shaft and a driving means; a handle portion including a handle frame connected upright to the front wheel shaft, an operation panel arranged on an upper part of the handle frame and provided with a folding switch and a handle formed on an upper part and provided with an acceleration lever and a hand brake; a seat portion a front of which is connected rotatably to the front frame and a rear of which is connected to the rear frame in an up down adjustable way of height and on which a sensing sensor is arranged; and a controller for controlling a driving and folding of the electronic car.

11 Claims, 11 Drawing Sheets

AUTOMATIC FOLDING ELECTRONIC CAR

CROSS-REFERENCE(S) TO RELATED APPLICATION

This application claims priority of Korean Patent Application No. 10-2015-0017465, filed on Feb. 4, 2015, in the Korean Intellectual Property Office, which is hereby incorporated by reference in its entirety.

BACKGROUND OF THE INVENTION

1. Field of the Invention

The present invention relates to an automatic folding electronic car, and more particularly, to an automatic folding electronic car which is driven with power supplied from a battery and moved and kept conveniently by being folded or unfolded.

2. Description of the Related Art

Generally, an electronic car is a kind of device used for providing mobility for a user to move promptly and conveniently to a desired place, and it is called as electronic scooter, or 3 wheel or 4 wheel auto-bicycle and used for helping an disabled or aged who are poor in walking as well as a general person to move without aids of other persons.

FIG. 1 is a side view of an electronic car according to a conventional art. Referring to FIG. 1, under an electronic car according to a conventional art a main body 10 is moved on ground with a plurality of wheels 11 that are driven by a driving motor (not shown), a handle 30 for converting the wheels 11 into a progress direction is arranged on a front of the main body 10, a seat 40 on which a passenger can seat in a comfortable position is attached on the main body 10, and a battery 20 for supplying power to a driving motor is arranged thereof. Further, a controlling portion for controlling the driving and movement of the car, a braking device such as a brake, and various equipments for convenience are arranged on the main body.

As described above, according to an electronic car of a conventional art a driving motor is driven with power applied from a battery 20 to rotate a driving shaft thereby to make forward movement or reward movement of the main body 10, the progress direction of the car is controlled in accordance with the operation of the handle 30 and the car is stopped temporally by the operation of the braking device and the car is braked by cutting off the power.

With respect to the configuration described above Korean Patent No. 10-05410221 (published Jan. 11, 2006) of Patent Document 1 has disclosed an electronic scooter provided with a brake releasing device in which a lining plate, a brake pad and a friction plate provided on one side of a yoke are mounted on one side of a motor and a key shaft of the motor is connected to the brake pad, thereby braking selectively the scooter, and combined with an operation lever where an operation units for allowing the brake pad to be rotated freely by spacing an interval between the lining plate and the friction plate depending on the rotation operation are formed on both ends thereof.

Korean Utility Model No. 20-0259004 (published on Jan. 4, 2002) of Patent Document 2 has disclosed a 3 wheel or 4 wheel auto bicycle in which left and right differential gears meshing with up and down differential gears are arranged to be meshed with the catching portions of a driving axle that is fitted into the rear left and right wheels, a driving gear formed on an outer peripheral surface of the right differential gear is meshed with the forward and reverse driven gear and the forward and reverse driven gear is fitted between a forward gear and an idle gear to be meshed with a reverse gear such that the power converted by a power connection unit of a forward and reverse converting shaft that is moved left and rightward by the operation lever is connected to a power transmission pulley.

However, according to a conventional art of Patent Documents 1 and 2 the electronic scooter has large volume and heavy weight and thus there has been a problem in that the electronic scooter is difficult to be kept, carried and transferred.

Korean Utility Model No. 20-0261766 (published on Jan. 24, 2002) of Patent Document 3 has disclosed a foldable electronic scooter, including: a main body frame on a front end and rear end of which a front wheel and rear wheel are provided, respectively; a handle that is arranged rotatably by the bearings fixed on a front end of the main body frame and controls the progress direction of the front wheel; a foldable unit provided between the main body frame and the bearings and allows the handle to be folded with respect to the main body frame; and a saddle on which a passenger seats and which is provided uprightly on one side of the main frame and detachable.

However, according to a conventional art of Patent Document 3 a user has to release directly a fixing portion from a catching bolt, retract from a curved portion by rotating the fixing portion around a catching pin with respect to a front end of the catching bolt, and then fold it with respect to the main body frame by rotating the handle together with a foldable rod. Accordingly, there has been a problem in that a user has to fold manually the electronic car with his/her effort and finds some cases where he/she cannot fold rapidly and conveniently the electronic car.

Further, according to Patent Documents 1, 2 and 3, the seat on which a passenger seats is in a fixing type such that the passenger has difficulty to take a proper posture on an uphill road or downhill road, causing inconvenient and unstable seating.

SUMMARY OF THE INVENTION

The present invention has been proposed to solve the drawback as described above and an aspect of the present invention is directed to an automatic folding electronic car which can be kept, carried and transferred while it is folded in a small size of light and compact shape, and move at obstacle regions of stairs, etc., and by using a public transportation means. Further, the automatic folding electronic car of the present invention can be folded or unfolded automatically and thus can be used with being folded rapidly and conveniently.

Further, the up and down angle of the seat on which a passenger seats is adjusted automatically in accordance with the slope degree of the electronic car so that the passenger can take a proper horizontal posture even at an uphill road or downhill road and move stable and conveniently.

An automatic folding electronic car according to the present invention, which is driven with power supplied from a battery and folded automatically may include: a body portion to which a front frame and a rear frame are connected rotatably through a connection shaft and on which a support shaft is formed on an upper part of the rear frame so as to support the front frame from a rear side; a front wheel portion that is arranged on a front of the body portion and is provided with a pair of front wheels connected through a front wheel shaft and a braking means; a rear wheel portion that is arranged on a rear of the body portion and is provided with a pair of rear wheels connected through a rear wheel shaft and a driving means; a handle portion including a handle frame connected upright to the front wheel shaft, an operation panel arranged on an upper part of the handle frame and provided with a folding switch and a handle formed on an upper part and provided with an acceleration lever and a hand brake; a seat portion a front of which is connected rotatably to the front frame and a rear of which is connected to the rear frame in an up down adjustable way of height and on which a sensing sensor is arranged; and a controller for controlling a driving and folding of the electronic car.

According to the present invention, an automatic folding electronic car which can be kept, carried and transferred while it is folded in a small size of light and compact shape, and move at obstacle regions of stairs, etc., and by using a public transportation means, and further, can be folded or unfolded automatically and thus can be used with being folded rapidly and conveniently.

Further, according to the present invention the up and down angle of the seat on which a passenger seats is adjusted automatically in accordance with the slope degree of the electronic car so that the passenger can take a proper horizontal posture even at an uphill road or downhill road and move stable and conveniently.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
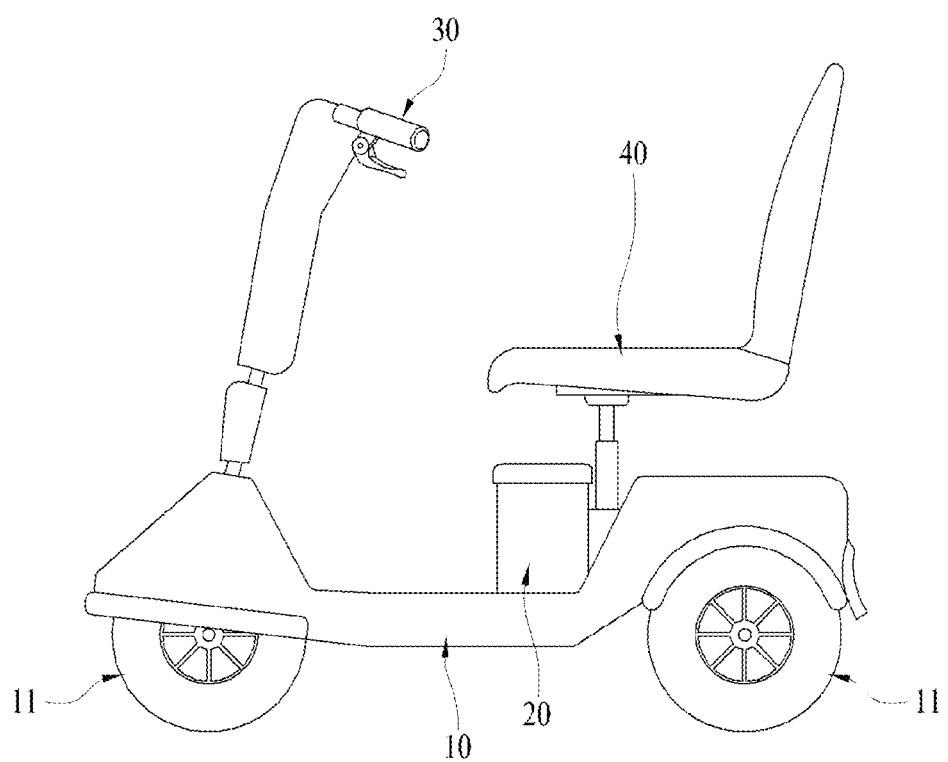
FIG. 1 is a view of an electronic car according to a conventional art.

Exemplary embodiments of the present invention will be described below in detail with reference to the accompanying drawings. Wherever possible, the same reference numerals will be used to refer to the same elements throughout the specification, and a duplicated description thereof will be omitted.

Figure 2:
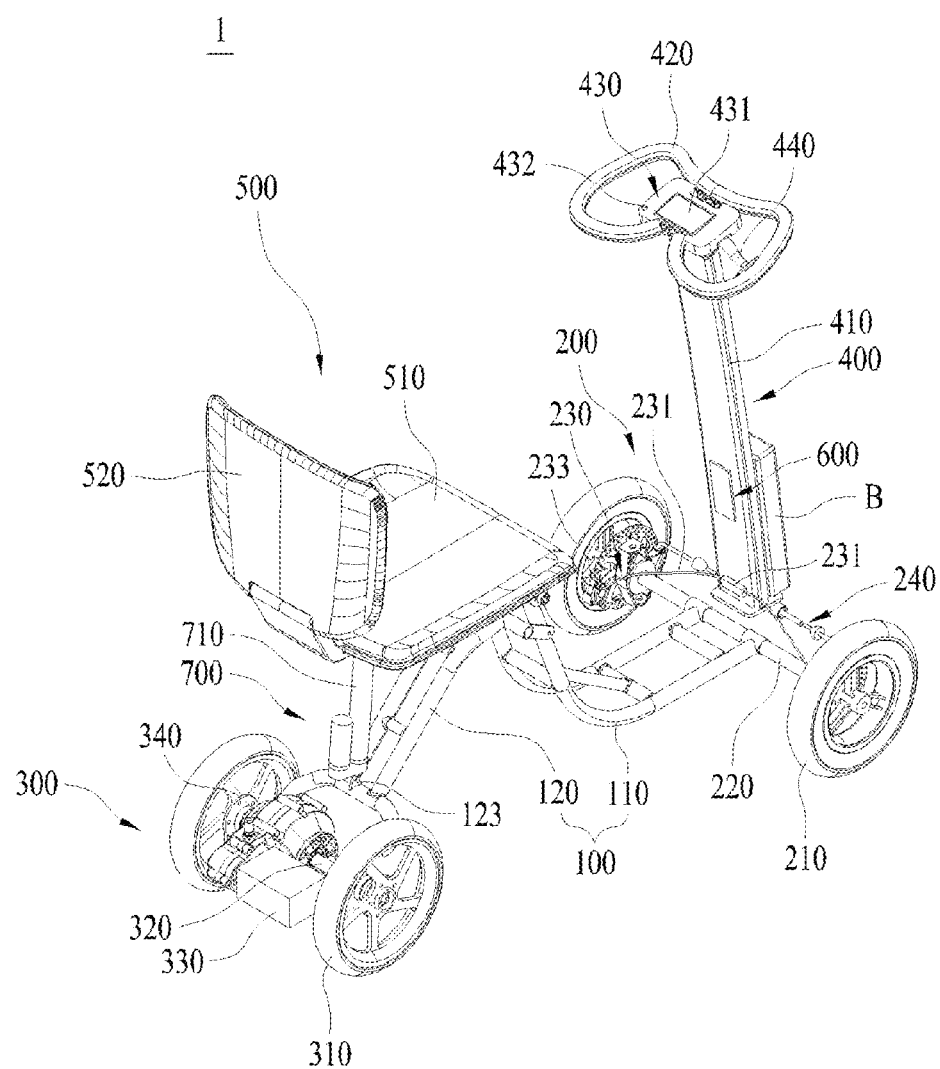
FIG. 2 is a perspective view of an automatic folding electronic car according to the present invention.
Figure 3:
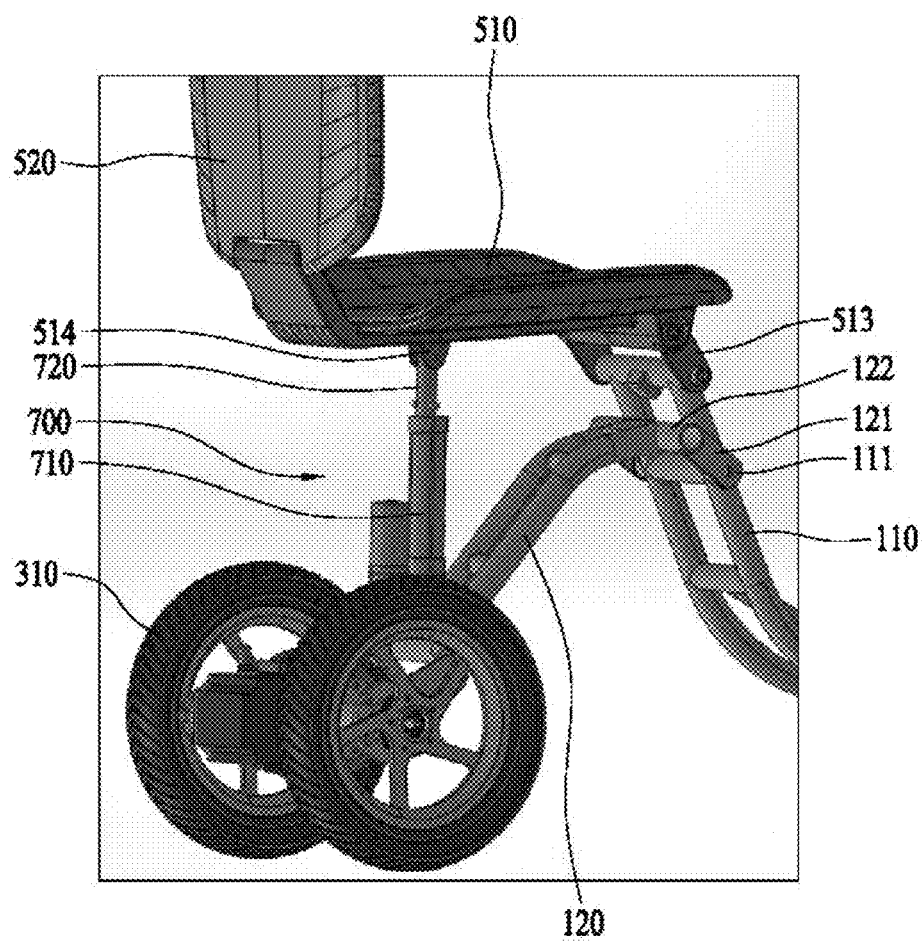
FIG. 3 is a detailed view of a lower part of a seat part of an automatic folding electronic car according to the present invention.

Referring to FIG. 2, an automatic folding electronic car 1 according to the present invention which is driven automatically with power supplied from a battery and folded or unfolded automatically to be moved and kept conveniently, may include a body portion 100, a front wheel portion 200, a rear wheel portion 300, a handle portion 400, a seat portion 500 and a controller 600 and may further include a seat angle amending device 700.

The body portion 100 is configured by connecting a front frame 110 and a rear frame 120 each other and at this time a connection shaft 111 is formed horizontally on an upper part of the front frame 110 and the rear frame 120 is connected rotatably to both sides of the connection shaft 111 through a connection pin 121.

The front frame 110 is curved in " ⌐ " shape and a front wheel shaft 220 of the front wheel portion 200 is connected to a lower part of the front frame and a rotation piece 513 of the seat portion 500 is connected rotatably to an upper part thereof together with a seat 510.

A supporting shaft 122 connected to a connection piece 121 is formed horizontally on an upper part of the rear frame 120 and the supporting shaft 122 is arranged to contact a rear part of the front frame 110 when the electronic car 1 is unfolded for use, and to support the front frame 110. Further, a rear wheel shaft 320 of the rear wheel portion 300 is connected to a rear part of the rear frame.

An attaching piece 123 is attached to a rear part of the rear frame 120 and the seat angle amending device 700 is connected rotatably to the attaching piece 123 through a shaft.

The front wheel portion 200 is installed on a front of the body portion 100 and is provided with a pair of front wheels 210 that are connected through a front wheel shaft 220 combined to a lower part of the front frame 110, and a braking means 230 is installed thereon.

Here, the braking means 230 may include: a braking actuator 231 for providing a braking force from the handle portion 400; a braking cable 232 connected to the braking actuator 231; and a caliper 233 arranged on both front wheels 210 while being connected to the braking cable 232.

Figure 4:
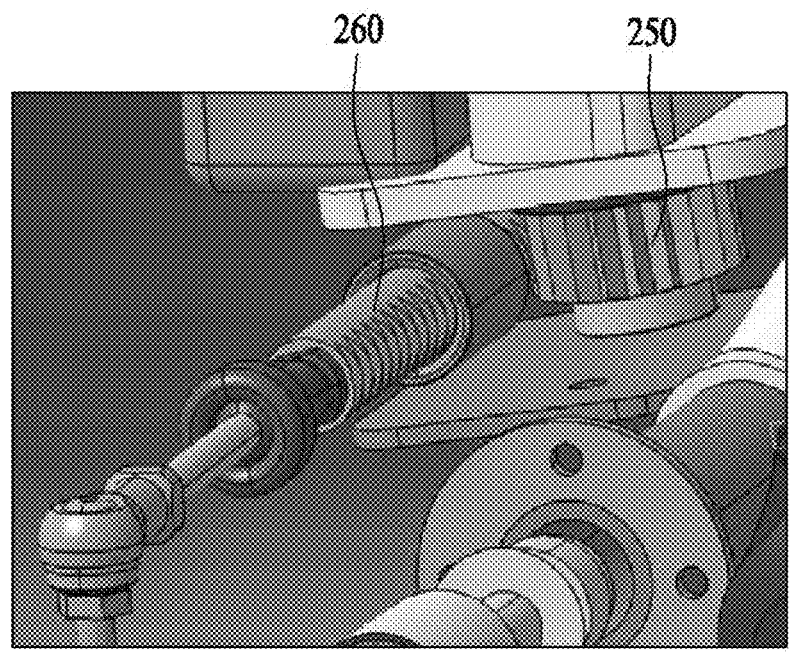
FIG. 4 is a view of a steering operation of an automatic folding electronic car according to the present invention.

Referring to FIG. 4, a steering shaft 240 is provided between the front wheels 210, a rack 260 is formed on a middle of the steering shaft 240 and a pinion 250 is arranged on a lower end of the handle shaft 411 such that the pinion 250 rotating is meshed with the rack 260 moving horizontally in accordance with the operation of the handle 420 by a passenger on the electronic car 1, thereby allowing the steering shaft 240 provided with the rack 260 to be moved left and rightward to steer the electronic car 1.

The rear wheel portion 300 is arranged on a rear part of the body portion 100 and is provided with a pair of rear wheels 310 that are connected through a rear wheel shaft 320 combined to a lower part of the rear frame 120, and a driving means 330 is installed thereon. The driving means 330 is applied with power from a battery B to drive the pair of rear wheels 310, and is operated with connection to a reduction gear 340.

Figure 5:
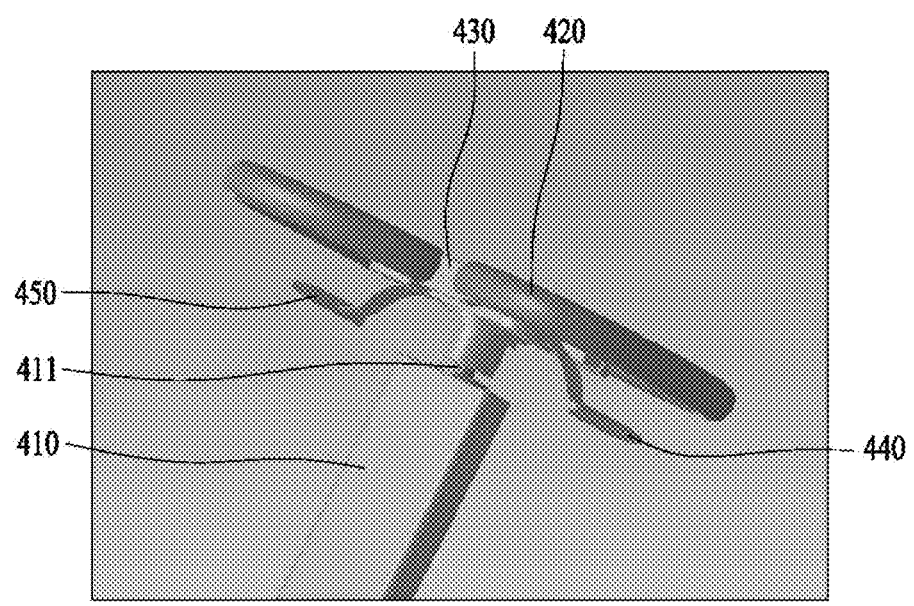
FIG. 5 is a view of a handle configuration of an automatic folding electronic car of the present invention.

Referring to FIG. 5, the handle portion 400 is arranged on a front of the electronic car, the handle frame 410 is connected upright to the front wheel shaft 220 and the handle shaft 411 is arranged inside the handle frame 410.

Further, a handle 420 connected to the handle shaft 411 is provided on an upper part of the handle portion 400 and an acceleration lever (not shown) and a hand brake (not shown) are provided on the handle 420 wherein the shape and operation way of the acceleration lever and the brake may be formed variously. For example, the acceleration lever may be operated by grasping and rotating it like an acceleration lever installed on a common auto bicycle and the hand brake may be provided on a lower part of the acceleration lever and be operated by pulling up while grasping the acceleration lever.

Meanwhile, an operation panel 430 is arranged on an upper part of the handle frame 410 and a display 431 consisting of a liquid crystal panel and a folding switch 432 allowing the automatic folding electronic car to be folded or unfolded automatically are provided on the operation panel 430.

Further, a forward and reverse lever 440 is provided on one side of the operation panel 430 and a parking brake lever 450 is provided on the other side thereof.

The seat portion 500 may include a seat 510 on which a passenger seats and a foldable back of a chair 520 which is connected to a rear part of the seat portion, and at this time the back of a chair 520 may be foldable automatically or manually.

Further, a sensing sensor and an incline sensor may be provided on the seat portion 500 wherein the sensing sensor senses the passenger who seats on the seat 510 or an object which puts on the seat 510 and the loads thereof, and the incline sensor senses a slope of an electronic car which puts on a road surface to transmit the sensed signal to the controller 600.

Meanwhile, a front of the seat portion 500 is connected rotatably to the front frame 120 and a rear thereof is connected to the rear frame 120 in an up and down adjustable way of height.

That is, a rotation piece 513 is connected to a front lower part of the seat portion 500 and the rotation piece 513 is connected rotatably to an upper part of the front frame 110, and the support piece 514 is connected to a rear lower part of the seat portion 500 and the support piece 514 is connected rotatably to the control rod 720 provided on the sea angle amending device 700 through a shaft.

The controller 600 is provided on the handle frame 410 to control the driving and folding of the electronic car 1.

The seat angle amending device 700 is connected upward to the attaching piece 123 of the rear frame 120 and is provided with an angle amending actuator 710 on which the control rod 720 which is moved vertically to adjust a rear height of the seat portion 500 is provided.

At this time, when the incline sensor transmits the sensed signal where the slope of an electronic car putting on a road surface is sensed to the controller 600, the controller 600 operates the angle amending actuator 710 in accordance with the received slope value thereby to control the seat portion 510 to keep as being horizontal. Accordingly, a passenger can keep a proper horizontal posture even uphill or downhill road and move stably and conveniently while boarding on the electronic car 1.

Hereinafter, the procedures of folding and unfolding the automatic electronic car configured as described above will be described referring to the drawings.

Figure 6:
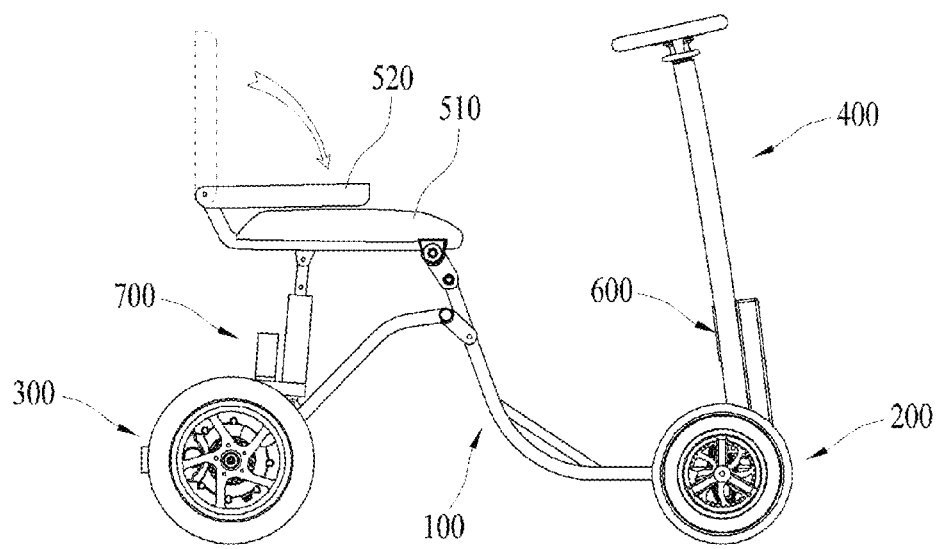
FIGS. 6-8 are views of folding procedures of an automatic folding electronic car of the present invention.

As shown in FIG. 6, firstly, the back of a chair 520 of the seat portion 500 is folded in order to fold the electronic car 1 and at this time the back of a chair may be folded automatically or manually.

In addition, when the folding switch 432 is selected as a folding mode, a folding procedure starts wherein the sensing sensor 510 arranged on the seat 510 senses whether a passenger or an object exists on the seat 510, and the incline sensor arranged on the seat 510 senses the slope of the electronic car 1 putting on a road surface. Further, the sensing signal sensed by the sensing sensor and the slope value sensed by the incline sensor are transmitted to the controller 600 and the controller determines whether a passenger seats or an object exists on the seat, or whether the slope of an electronic car is proper for the folding based on the transmitted sensed signal and slope value.

At this time, when the sensing sensor senses the passenger seating on the seat 510 or the object putting on the seat 510 or when the slope value sensed by the incline sensor is a reference value or more, the smooth folding procedure cannot be performed and thus the controller 600 makes a warning sound and then stops the folding procedure.

On the contrary, in a case where the sensing sensor does not sense the passenger on the seat 510 and the slope value sensed by the incline sensor is less than the reference value, the controller 600 continues the folding procedure of a following step.

Figure 7:
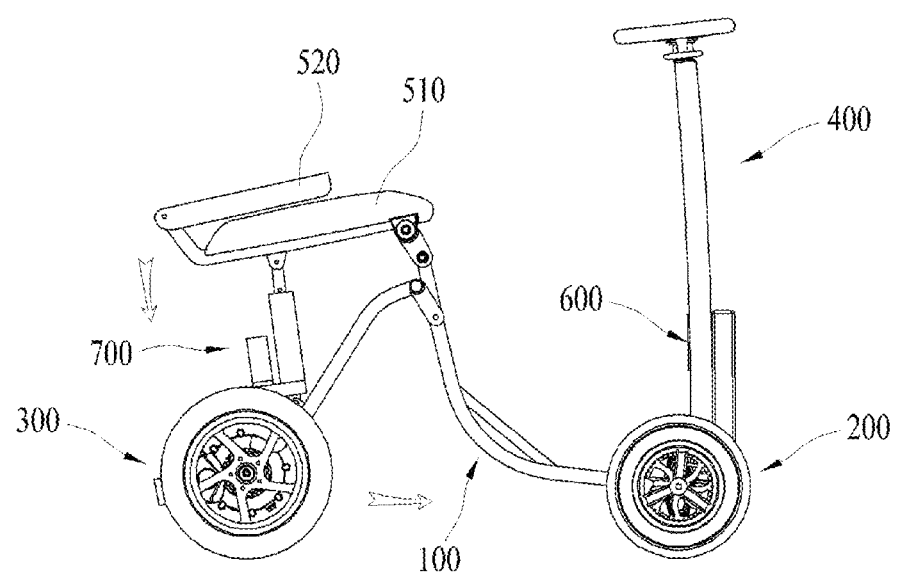
Figure 8:
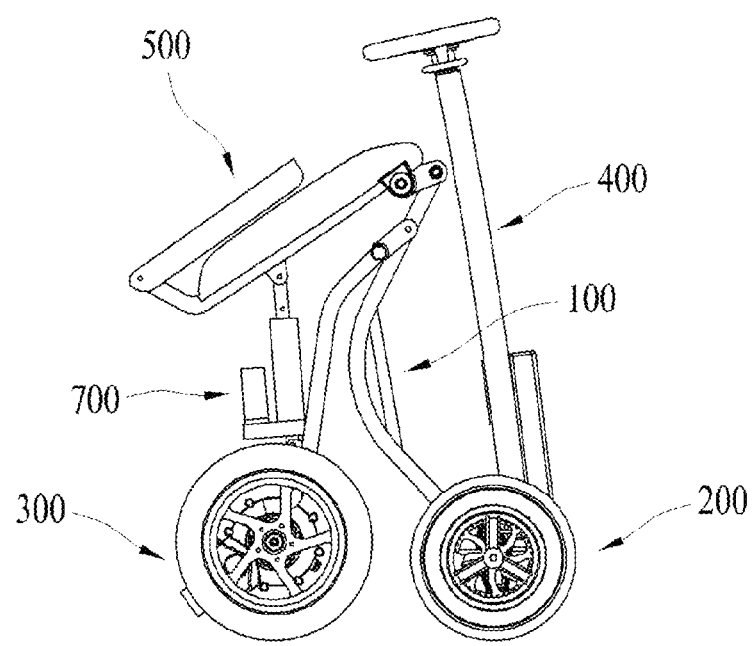

Next, referring to FIG. 7, the controller 600 moves the seat portion 500 downward to fold it through the control rod 720 by operating the angle amending actuator 710 of the seat angle amending device 700 while fixing the front wheels 210 not to be moved and steered by operating the braking actuator 231 to brake the front wheels 210, and moves the rear wheels 310 forward by operating the driving means 330, thereby forming the electronic car to be folded, as shown in FIG. 8.

Figure 9:
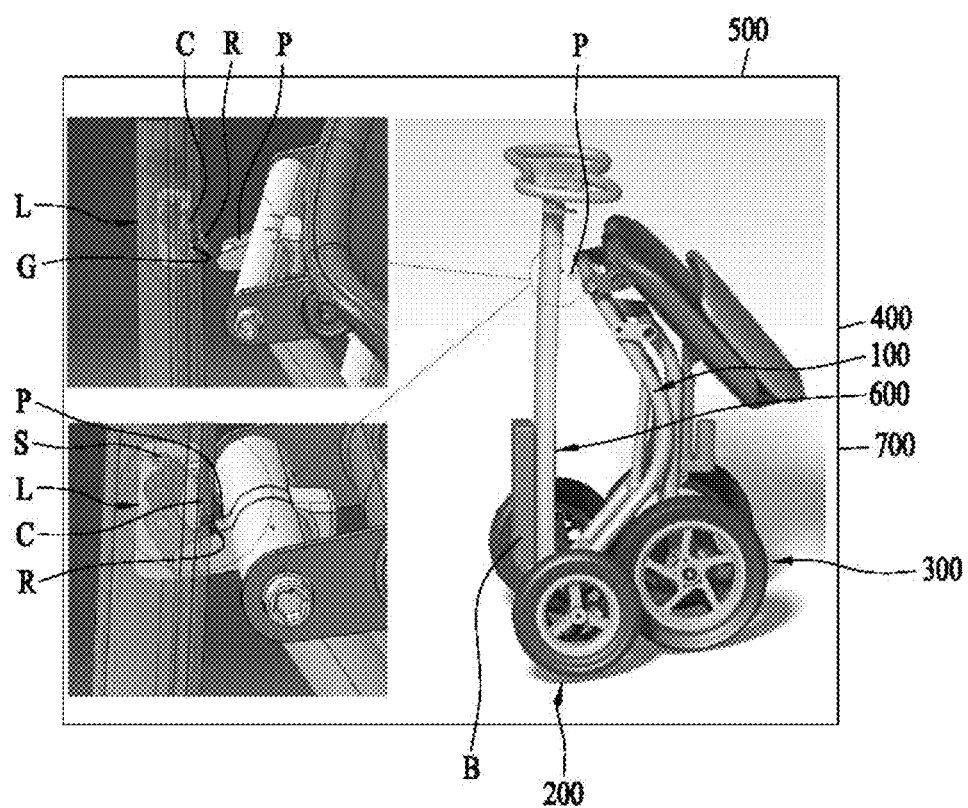
FIG. 9 is a view of a latch configuration of an automatic folding electronic car of the present invention.

Meanwhile, referring to FIG. 9, the handle frame 410 and the upper part of the front frame 110 are locked and fixed through a latch structure while the body portion 100 moves forward to be folded when the electronic car 1 is folded.

That is, when the electronic car 1 is folded, a protrusion P is connected to a groove G of a latch L formed on the handle frame 410 and then a folding completion switch S operates to be connected to the latch L through a spring C and a locking lever R rotates to lock and fix the protrusion P.

Further, when the operation of the braking actuator 231 is released, the electronic car may be folded in a small size of light and compact shape to be carried and transferred, and move conveniently at obstacle regions of stair, etc., and by using a public transportation means.

On the contrary, in order to unfold the electronic car 1, firstly, the folding switch 432 is selected as an unfolding mode and then an unfolding procedure starts and the locking and fixing of the latch is released from the electronic car.

Next, the incline sensor arranged on the seat 510 senses the slope of the electronic car 1 putting on a road surface and the slope value sensed by the incline sensor is transmitted to the controller 600 and the controller 600 determines whether the slope value is proper for the unfolding procedure.

At this time, when the slope value sensed by the incline sensor is a reference value or more, the smooth unfolding procedure cannot be performed and thus the controller 600 makes a warning sound and then stops the unfolding procedure.

On the contrary, when the slope value sensed by the incline sensor is less than the reference value, the controller 600 continues the unfolding procedure of a following step.

Next, the controller 600 moves the seat portion 500 upward to unfold it through the control rod 720 by operating the angle amending actuator 710 of the seat angle amending device 700 while fixing the front wheels 210 not to be moved and steered by operating the braking actuator 231 to brake the front wheels 210, and moves the rear wheels 310 rearward by operating the driving means 330, thereby forming the electronic car to be unfolded, as shown in FIG. 2.

Further, the controller allows the electronic car 1 to be movable by releasing the braking actuator 231 and after unfolding the back of a chair 520 a passenger can move to a desired place by grasping the handle 420 and operating an acceleration lever and a hand brake while he/she seats on the seat 510.

Meanwhile, describing the operation procedures of the seat angle amending device 700 of the electronic car 1, as shown in FIG. 10(*a*), when a passenger goes to uphill road while he/she boards on the electronic car 1, the incline sensor arranged on the seat portion 500 senses the slope of the electronic car 1 and transmits the sensed signal to the controller 600. At this time, when the received slope value is less than the reference value, the controller 600 moves upward the control rod by operating the angle amending actuator in accordance with the slope value to control the seat 510 as being in a horizontal state. Further, when the slope value received by the controller 600 from the incline sensor is departed from the reference value while the passenger seating on the electronic car 1 goes to uphill road and into a flat road, the controller moves the control rod downward by operating the angle amending actuator 710, thereby returning the seat 510 to its original state.

Figure 10A:
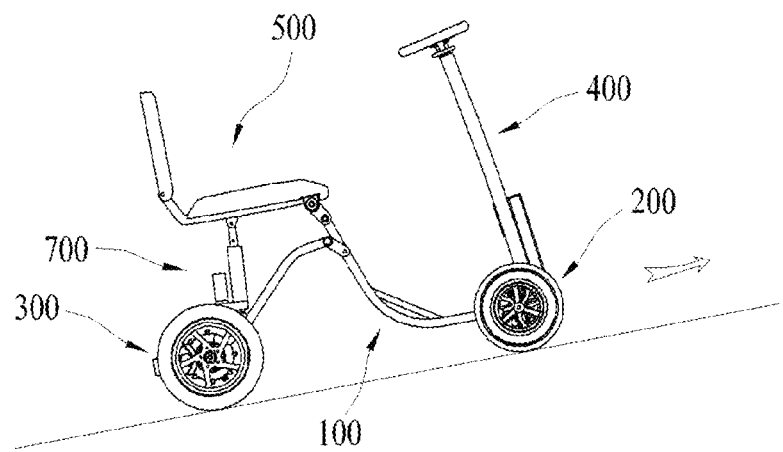
FIGS. 10($a$) and 10($b$) are views of a seat angle amending device of an automatic folding electronic car of the present invention.
Figure 10A:
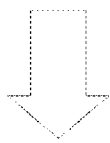
Figure 10A:
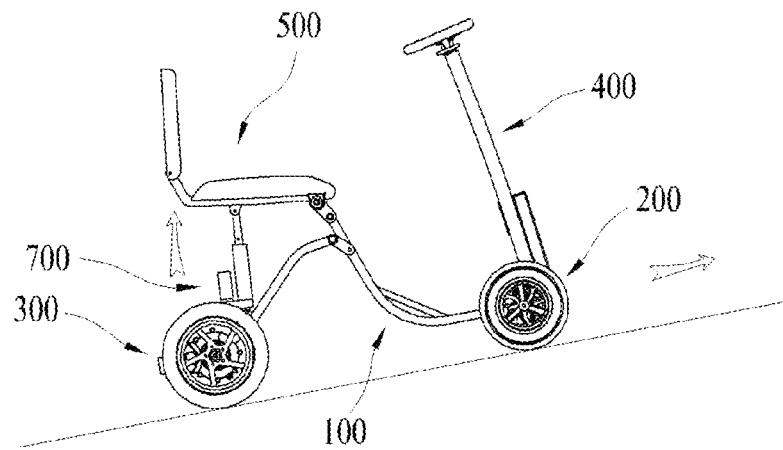
Figure 10B:
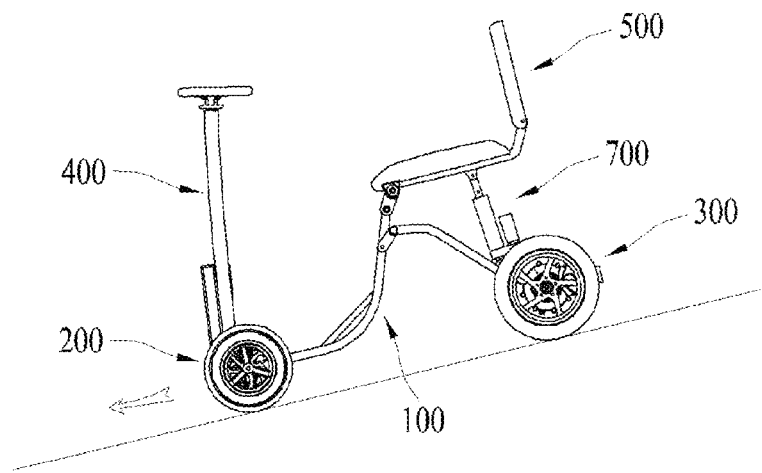
Figure 10B:
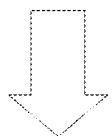
Figure 10B:
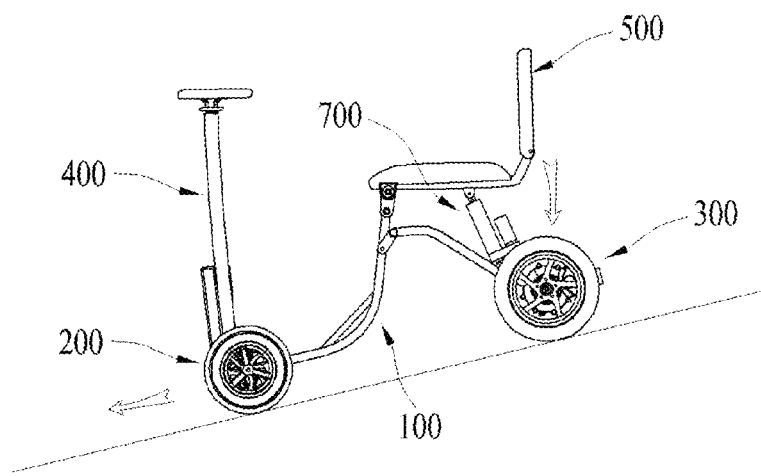

On the contrary, as shown in FIG. 10(b), when a passenger goes to a downhill road while he/she seats on the electronic car 1, the incline sensor arranged on the seat portion 500 senses the slope of the electronic car 1 and transmits the sensed signal to the controller 600, the controller 600 moves the control rod 720 downward by operating the angle amending actuator 710 in accordance with the received slope value to control the seat 510 as being in a horizontal state, and when the slope value received by the controller 600 from the incline sensor is departed from the reference value while the passenger seating on the electronic car 1 goes to downhill road and into a flat road, the controller moves the control rod upward by operating the angle amending actuator 710, thereby returning the seat 510 to its original state.

As described above, the up and down angels of the seat 510 of the electronic car 1, on which a passenger seats, is controlled automatically in accordance with the slope degree of the electronic car 1 so that the passenger can keep a proper posture even at an uphill road or downhill road and thus can move stable and conveniently.

At this time, the controller 600 determines whether the received slope value sensed by the incline sensor is within the reference value wherein when the slope value is within the reference value, the controller determines as an uphill road or downhill road and operates the angle amending actuator 710 of the seat angle amending device 700 to allow the passenger to keep a horizontal posture, and when the slope value is departed from the reference value, the controller determines as a flat road and the amending of the seat angle is not made.

Further, only when the slope value of an uphill road or downhill road is kept with the reference value for the time period greater than a reference time period, the angle amending actuator 710 of the seat angle amending device 700 is set to operate so that the durability of the components of the electronic car 1 is increased and frequent posture control for a passenger is avoided, thereby boarding on the electronic car at a convenient and stable posture.

For example, in a case where there is a raised spot or a sank groove, the inclined slope is resolved soon and thus if the seat angle amending device 700 is operated even in this case, it causes rather uncomfortable feeling to a passenger.

As a result, an automatic folding electronic car 1 according to the present invention can be kept, carried and transferred while it is folded in a small size of light and compact shape, and move at obstacle regions of stairs, etc., and by using a public transportation means. Further, the automatic folding electronic car can be folded or unfolded automatically and thus can be used with being folded rapidly and conveniently, and further the up and down angle of the seat on which a passenger seats is adjusted automatically in accordance with the slope degree of the electronic car so that the passenger can take a proper horizontal posture even at an uphill road or downhill road and move stable and conveniently.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An automatic folding electronic car that is driven with power supplied from a battery and folded automatically comprising:
   a body portion to which a front frame and a rear frame are connected rotatably through a connection shaft and on which a support shaft is formed on an upper part of the rear frame so as to support the front frame from a rear side;
   a front wheel portion that is arranged on a front of the body portion and is provided with a pair of front wheels connected through a front wheel shaft and a braking means;
   a rear wheel portion that is arranged on a rear of the body portion and is provided with a pair of rear wheels connected through a rear wheel shaft and a driving means;
   a handle portion including a handle frame connected upright to the front wheel shaft, an operation panel arranged on an upper part of the handle frame and provided with a folding switch and a handle formed on an upper part and provided with an acceleration lever and a hand brake;
   a seat portion a front of which is connected rotatably to the front frame and a rear of which is connected to the rear frame in an up down adjustable way of height and on which a sensing sensor is arranged; and
   a controller for controlling a driving and folding of the electronic car.

2. The automatic folding electronic car of claim 1, wherein the controller stops a folding procedure when the sensing sensor senses a passenger who seats on a seat or an object which puts on the seat.

3. The automatic folding electronic car of claim 1, wherein the braking means on the front wheel portion comprises a braking actuator for supplying a braking force, a brake cable connected to the braking actuator and a caliper that is connected to the brake cable and arranged to the front wheels at both sides.

4. The automatic folding electronic car of claim 1, wherein the driving means on the rear wheel portion is connected to a reduction gear to drive the rear wheels.

5. The automatic folding electronic car of claim 1, wherein the handle is provided with an acceleration lever and a hand brake, a display is mounted on the operation panel and a forward and reverse lever is arranged on one side of the operation panel and a parking brake lever is arranged on the other side thereof in the handle portion.

6. The automatic folding electronic car of claim 1, wherein a foldable back of a chair is connected to a rear of the seat portion.

7. The automatic folding electronic car of claim 1, further comprising a seat angle amending device that is connected upward to the rear frame and is provided with an angle amending actuator on which the control rod which is moved vertically to adjust a rear height of the seat portion is provided.

8. The automatic folding electronic car of claim 7, wherein an incline sensor is arranged on the seat portion, and the controller controls the seat as being horizontal by operating the angle amending actuator in accordance with the received slope when the incline sensor transmits the sensing signal of the slope of the electronic car to the controller.

9. The automatic folding electronic car of claim 8, wherein when the slope value sensed by the incline sensor is a reference value or more, the controller stops the folding or unfolding procedure.

10. The automatic folding electronic car of claim 7, wherein a support piece attached to a rear lower part of the seat portion is connected rotatably to the control rod through a shaft, and the seat angle amending device is connected rotatably to an attaching piece attached to a lower part of the rear frame through a shaft.

11. The automatic folding electronic car of claim 1, wherein the handle frame and an upper part of the front frame are locked through a latch structure when the electronic car is folded.

\* \* \* \* \*